United States Patent Office 2,992,081
Patented July 11, 1961

2,992,081
CORROSION INHIBITED COMPOSITION
David B. Sheldahl, Griffith, Ind., and Thomas O. Counts, Park Forest, Ill., assignors to Sinclair Refining Company, New York, N.Y., a corporation of Maine
No Drawing. Filed July 30, 1957, Ser. No. 675,016
5 Claims. (Cl. 44—66)

This invention relates to new compositions of matter and more particularly to a new class of chemical compounds derived from the reaction of a monocarboxylic acid, a fatty amido diamine and an aromatic sulfonic acid. In other aspects this invention relates to novel compositions of matter and their use as a corrosion inhibitor in liquid mineral oils which normally come in contact with metals.

Various corrosion inhibitors have been suggested for use in liquid mineral oil bases for the protection of metal surfaces, both internal and external, which come in contact with the base oils. Many of these inhibitors when included in distillate fuels, for example, have proved disadvantageous inasmuch as films produced therefrom do not exhibit sufficient resistance to moisture, particularly under high humidity conditions. In many applications, as in diesel engine flushing fuels, for example, the base oil must be inhibited against corrosion under high humidity conditions and at the same time it is desirable, and in fact some specifications require, that the inhibitor be ashless.

In accordance with this invention we have found that corrosion problems occurring from mineral oils contacting metallic surfaces can be materially lessened through use of novel corrosion inhibitors prepared by reacting certain fatty amido diamines, monocarboxylic acids and aromatic sulfonic acids. The inhibitor products are identified as mono-sulfonate fatty amido diamine salts of monocarboxylic acids and as shown hereinafter, these reaction products have been found to exhibit marked protection of metal surfaces, particularly ferrous surfaces, which are in contact with liquid mineral oil products containing small amounts of moisture. When blended in mineral oil products such as gasoline and diesel fuel, such fuels easily pass humidity cabinet corrosion tests which thus indicates their resistance to moisture under high humidity conditions. Moreover, the inhibitors give protection in static and dynamic systems, e.g. storage tanks and pipelines. The novel inhibitor products of this invention effectively prevent corrosion without influencing basic characteristics of the mineral oil products in which they are incorporated and are further advantageous in that they will not form a combustion ash upon being subjected to relatively high temperatures.

The corrosion inhibiting compositions of this invention are formed by adding to a suitable mineral oil base a compound or mixture of compounds having the formula:

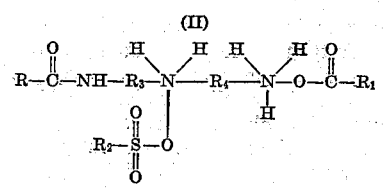

in which R and $R_1$ represent monovalent hydrocarbon radicals containing from about 6 to 22 carbon atoms, $R_2$ is the aromatic hydrocarbon radical derived from aromatic sulfonic acids, and $R_3$ and $R_4$ are divalent aliphatic hydrocarbon radicals, each of about 2 to 8 carbon atoms, branched or straight chained and substituted or unsubstituted. The groups R and $R_1$ may be alike or different, saturated or unsaturated, straight chain or branched chain, may contain substituent groups such as amino, halogen, hydroxy, nitrile, and the like and preferably are aliphatic.

The novel corrosion inhibiting compounds of the present invention are the mineral oil-compatible, i.e. dispersible, soluble or miscible without continuing agitation, materials identified as mono-sulfonate fatty amido diamine salts of monocarboxylic acids and can be prepared, for example, by reacting an aromatic sulfonic acid and monocarboxylic acid in stoichiometric amounts with the fatty amido diamine. The reaction is almost instantaneous if carried out at a temperature between about 100 to 120° F. but will occur slowly at room temperature. If desired, the reaction may be effected with the aid of a solvent or at higher temperatures below the decomposition point of the reactants or product. Advantageously, as shown hereinafter, more than the stoichiometric amounts of the reactants can be employed; for example, up to twice as much or more of the reactants can be present and the excess resulting from the reaction may be included with the principal corrosion inhibiting salt when added to a mineral oil base.

The fatty amido diamines which are used in accordance with the invention are represented by the following general formula:

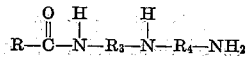

in which R is a hydrocarbon group containing at least about 6 and preferably 12 to 22 carbon atoms and $R_3$ and $R_4$ are as described above. Preferably, $R_3$ and $R_4$ are polymethylene groups of about 2 to 8 carbon atoms, advantageously 2 to 4 carbon atoms. The members of this class of diamine compounds are cationic and possess one primary and secondary amine group in addition to an acyl radical attached to the amide nitrogen. The acyl radical in the above formula may be straight or branched chain, or alicyclic, may contain substituent groups such as halogen, amino, hydroxy, nitrile, and the like, and is preferably an aliphatic carboxylic acid residue of high molecular weight fatty acids, either saturated or unsaturated. Examples of such acids are oleic acid, stearic acid, palmitic acid, linoleic acid, linolenic acid, ricinoleic acid, monohydroxy stearc acid, lauric acid, high molecular weight naphthenic acids, fatty acids obtained from the oxidation of petroleum waxes, and the like. Fatty acids which are particularly desirable for providing the carboxylic acid residue can be obtained from vegetable oils and animal fats such as soybean oil, coconut oil, lard oil, corn oil, castor oil, tallow, and the like. Other suitable carboxylic acid residues having the desired number of carbon atoms are the acids obtained from tall oil which contains a mixture of fatty acids and resin acids.

The fatty amido diamines can be prepared by reacting a polyalkylene triamine of the formula $$NH_2([CH_2]_n-NH)_2H$$

in which $n$ is a number from about 2 to 8, preferably 2 to 4, with a carboxylic acid or a derivative thereof, such as an ester, anhydride, or halide in such proportions and under such conditions as to effect monoacylation of one primary amino group present in the polyalkylene triamine. Fatty glycerides are examples of esters that are good acylating agents, and particularly preferred materials are corn oil or tallow which provide a saturated and unsaturated aliphatic hydrocarbon group of from about 16 to 18 carbon atoms. The fatty amido diamine is prepared by reacting a ratio of 1 mole of fatty acid for each mole of polyalkylene triamine at a temperature above 250° F. and preferably at a temperature of about 300 to 350° F. At temperatures below about 250° F., the reaction products will consist of salts of the polyalkylene triamine rather than the amide. Other methods of preparation which are satisfactory include reaction of the desired fatty acid and polyalkylene triamine with ammonia to obtain the corresponding amide. The amide is then reacted twice with acrylonitrile with each reaction being followed by hydrogenation to produce the final fatty amido diamine product.

An example of a preferred fatty amido diamine used in the preparation of the corrosion inhibitors of this invention is a commercial product designated as "Diamine 257" which corresponds to the above fatty amido diamine formula in which $R_3$ and $R_4$ are trimethylene and R is the straight chain unsaturated hydrocarbon radical derived from corn oil and having about 16 to 18 carbon atoms. This product is well known and is characterized by having an acid number of less than 5, an average amine equivalent weight of 210, and one primary and secondary basic amine group. The product has an appearance of a viscous liquid or fluid paste and has a density of 0.935 at 25° C.

The monocarboxylic acids which are used in the present invention are high molecular organic monocarboxylic acids of the formula R'—COOH in which R' represents a hydrocarbon residue or radical containing about 6 to 22 carbon atoms. The monocarboxylic acids may be straight chain or branched chain, substituted or unsubstituted, saturated or unsaturated, and include such acids as capric acid, caproic acid, undecylic acid, lauric acid, myristic acid, ricinoleic, oleic acid, linoleic, stearic acid, palmitic acid, margaric acid, arachidic acid, mixtures of any two or more of these acids or others, fatty acids derived from animal or vegetable sources, hydroxy and alpha-hydroxy fatty acids such as hydoxy stearic acid, dihydroxy stearic acid, alpha-hydroxy stearic acid, alpha-hydroxy lauric acid, and fatty acids derived from various waxes such as beeswax, spermaceti, and the like. Similarly, we may use monocarboxylic acids derived by oxidation of petroleum waxes, such as slack wax, crude foots oil, microcrystalline wax, etc., as well as naphthenic acid and abietic acid. Although reaction products formed the various above carboxylic acids are effective corrosion inhibitors, the preferred monocarboxylic acids used in accordance with this invention are those in which the hydrocarbon radical contains from about 12 to 18 carbon atoms, saturated or unsaturated, such as stearic acid, linoleic acid and palmitic acid, with particular preference being directed to oleic acid.

The sulfonic acid materials which can be used in the preparation of the corrosion inhibitors of this invention are the aromatic sulfonic acids including those derived from petroleum products. The useful petroleum sulfonic acids thus include the water-soluble or water-dispersible green acids and the preferentially oil-soluble acids referred to as mahogany acids. The green acids are found in the acid sludge resulting from the treatment of a suitable petroleum oil such as a liquid petroleum distillate boiling in the range of 600 to 1000° F. with fuming sulfuric acid or sulfur trioxide, and are in fact mixtures of water-soluble sulfonic acids known as black acids, intermediate detergent-type sulfonic acids, and oil-soluble sulfonic acids called brown acids. The green acids are hydrophilic in character and can be recovered from the acid sludge by adding water to the sludge to dilute the sulfuric acid therein to a concentration of about 20 to 30 percent, at which concentration the green acids separate to form the supernatant layer, or they can be extracted from the sludge by using water-soluble solvents. The mahogany acids, some of which show limited hydrophilic properties, are oil-soluble or hydrophobic by nature and can be recovered from the acid treated oil or obtained as a concentrate in the acid oil varying from 10 to 50 percent by weight. The useful mahogany acids generally have a molecular weight of from about 300 to 500, or more, and although their exact chemical structures may vary, it appears that such acids are composed to a large extent of sulfonated aromatic hydrocarbons having either one or two aromatic rings per molecule possibly with one or more long-chain alkyl groups containing from about 8 to 30 carbon atoms attached to the ring nuclei.

Suitable sulfonic acids which include both the oil and water-soluble petroleum sulfonic acids are the aryl sulfonic acids, benzene sulfonic acids, cymene sulfonic acid, naphthalene sulfonic acid, alkylated naphthalene sulfonic acid, fatty sulfonic and fatty aromatic sulfonic acids. Other useful aromatic sulfonic acids are the oil-soluble ammonia neutralized sulfonated mixtures of polyalkylated benzenes; alkyl aryl sulfonic acids in which the alkyl chain contains from about 8 to 18 carbon atoms; synthetic sulfonic acids prepared by reaction of paraffin wax chains of 20 or more carbons with aromatic nuclei which are then sulfonated by fuming sulfuric acid, e.g. wax substituted naphthalene; ammonium mahogany sulfonic acids obtained by reaction of ammonia with sulfuric acid treated hydrocarbon oils, ammonium sulfonates of the alkyl aryl sulfonic acids, particularly those having a monocyclic nucleus, all of which are available or may be readily prepared by known methods. Particularly suitable sulfonic acid materials are ammonia neutralized sulfonated Neolene bottoms described in U.S. Patent No. 2,671,757 to T. G. Wisherd, and the ammonium mahogany sulfonates described in U.S. Patent No. 2,632,694 to F. M. Watkins. The aromatic oil-soluble sulfonic acids are conveniently employed as a concentrate in the oil from which they are derived and are usually present as a 10 to 30 weight percent concentration.

The monosulfonate fatty amido diamine salts of monocarboxylic acids of this invention are effective in liquid petroleum hydrocarbons including light distillates, i.e. liquid hydrocarbons boiling up to and including gas oils, and lubricating oils. As examples they can be employed in gasoline, kerosene, petroleum solvents, diesel fuels, heating oils, neutral oils, etc. The amount employed in a given instance will depend upon the character of the base oil and the degree of corrosion inhibition desired with a small but sufficient amount being employed to give substantial corrosion inhibition. Generally, the inhibitor wil comprise from about 0.001 to 5.0 weight percent or more of the total composition with larger amounts being used as the specific gravity or viscosity of the base oil increases. As examples, with gasoline the amount of inhibitor will vary generally from about 0.001 to 2 weight percent of the total composition including the base oil with about 0.5 to 2 percent being particularly useful for humidity cabinet protection. On the same basis, about 0.001 to 3 weight percent of inhibitor would normally be used in diesel fuel with about 0.75 to 3 percent being preferred for flushing compositions. The corrosion inhibitors of the present invention may be used alone or in combination with other additives such as anti-foam agents, detergent additives, pour depressants, viscosity index improvers, etc., which improve the composition in one or more respects. Since the mineral oil is present in relatively large and major amounts the optimum concentration of any combination of additives will, of course, depend upon the particular type of mineral oil base stock and the potency of the additive combination contained therein.

The following specific examples will serve to illustrate the present invention but they are not to be considered limiting.

EXAMPLE I

A corrosion inhibitor of this invention was prepared in the following manner:

Six parts by weight of oleic acid, 10.5 parts by weight of "Diamine 257," and 83.5 parts by weight of mahogany sulfonic acids (10 percent solution in its base petroleum oil; 300 SUS at 100° F., Acid No. 16.4) were reacted at a temperature of 100 to 120° F. A clear homogeneous solution resulted which was a 25 percent concentrate of the monosulfonate fatty amido diamine salt of the oleic acid. The solution had the following properties:

| | |
|---|---|
| Gravity, API | 22.4 |
| Viscosity, SUS at 100° F. | 658 |
| Viscosity, SUS at 210° F. | 65.7 |
| Flash, ° F. | 370 |
| Fire, ° F. | 430 |
| Pour, ° F. | −20 |
| Color, NPA | 8− |
| Acid number | 26.0 |
| Saponification number | 24.5 |
| Nitrogen, percent | 1.07 |
| Sulfur, percent | 0.82 |

EXAMPLE II

A mono-sulfonate fatty diamine salt of oleic acid was prepared in the above manner by reacting 15.5 parts by weight of the mono-oleate salt of a fatty diamine with 84.5 parts by weight of mahogany sulfonic acids (10 percent solution in its base petroleum oil; 300 SUS at 100° F., acid No. 16.4). The fatty diamine employed was of the formula $RNH-(CH_2)_3-NH_2$ in which R is the straight chain hydrocarbon radical of 16 to 18 carbon atoms, saturated and unsaturated, derived from tallow fatty acids. The product was a 24 percent concentrate which analyzed as follows:

| | |
|---|---|
| Gravity, API | 23.7 |
| Viscosity, SUS at 100° F. | 451 |
| Viscosity, SUS at 210° F. | 60.5 |
| Flash, ° F. | 350 |
| Fire, ° F. | 410 |
| Pour, ° F. | −35 |
| Color, NPA | 7− |
| Acid number | 26.5 |
| Saponification number | 26.4 |
| Nitrogen, percent | 0.69 |
| Sulfur, percent | 0.81 |

In order to show the outstanding corrosion characteristics of the compounds of this invention, the novel inhibitor as prepared in Example I was blended with diesel fuel and subjected to a humidity cabinet corrosion test identified as the MIL-L-21260 type specification (Lubricating Oil, Internal Combustion Engine, Preservative). This test is carried out as follows:

Small sand blasted mild steel panels are dipped in the petroleum hydrocarbon and after draining two hours at room temperature are suspended in a highly humid atmosphere, generally about 100 percent humidity, at 120° F. in a special cabinet. The time of initial corrosion of the panels is noted. The humidity cabinet is provided with heating units and thermal regulators for automatic temperature control. A water level of 8 inches is maintained in the bottom of the cabinet and 8 linear feet per hour of clean air is bubbled through the water to assure high humidity at all times. The steel panels are suspended by stainless steel hooks around the periphery of the humidity cabinet. About three complete changes of air per hour are provided in the cabinet. In order to pass the test, no more than 3 rust spots 1 mm. in diameter should be observed on the panel after 6 days' exposure in the cabinet.

A summary of the humidity cabinet results obtained when using the mono-sulfonate fatty amido diamine salts of monocarboxylic acids as a corrosion inhibitor in diesel fuel is shown below. The diesel fuel employed had an API gravity of 38.6, a boiling range of 370 to 640° F. and an SUS viscosity of 35.6 at 100° F. The effectiveness of the novel inhibitor as prepared in Example I is revealed by the number of days the panel is exposed before failure occurred, and as compared to the mono-sulfonate-mono-oleate fatty diamine of Example II, striking differences in results were obtained. At the same concentration of 0.69 percent the reaction product of Example I gave good protection for over nineteen days whereas the fatty diamine salt of Example II was substantially less effective.

*Table 1*

MIL-L-21260 HUMIDITY CABINET TEST RESULTS

| Inhibitor | Concentration, Weight Percent Dry Soap Basis | Cabinet Life, Diesel Fuel, Days [1] |
|---|---|---|
| None | None | 1− |
| Mono-oleate mono-sulfonate salt of fatty amido diamine, as prepared in Example I. | 0.46 | 7 |
| | 0.69 | 19.5 |
| Mono-oleate mono-sulfonate salt of fatty diamine, as prepared in Example II. | 0.48 | 4 |
| | 0.69 | 6 |

[1] Number of days before two or three rust spots 1 mm. in diameter appear on test panel.

The following data of Table II illustrate the results obtained when the compounds prepared in accordance with the present invention were tested in mineral oil products such as gasoline and diesel fuel for dynamic corrosion inhibition properties. The reaction product of Example II, which does not contain the amide linkage, is used for comparison purposes with the composition of the present invention (Example I) which employs a fatty amido diamine as the amine constituent. The dynamic corrosion test is a modification of ASTM test D–665–47T for rust-preventing characteristics of steam turbine oil in the presence of water and is useful for determining the protection afforded by corrosion inhibitors under dynamic conditions, e.g. as in pipelines. In this modified procedure, a freshly ground rust test coupon consisting of ½-inch diameter by 5½ inches long mild steel rod is suspended in a 400 ml. beaker equipped with a stirrer and placed in a temperature controlled bath capable of maintaining the temperature of 100±1° F. The test fuel (350 ml.) is added and stirred for thirty minutes to allow the ruest inhibitor to precoat the test specimen. Part (50 ml.) of the test fuel is then removed and 30 cc. of distilled water is added. The mixture is stirred for a four-hour test period. At the end of this period, the coupon is removed, dried with suitable solvents, inspected and rated according to the following scale:

| | |
|---|---|
| A | No rust. |
| B++ | Trace rust (covering a maximum of 0.25% of total surface area). |
| B+ | 0.25 to 5% of surface area covered by rust. |
| B | 5 to 25% of surface area covered by rust. |
| C | 25 to 50% of surface area covered by rust. |
| D | 50 to 75% of surface area covered by rust. |
| E | 75 to 100% of surface area covered by rust. |

The test conditions are substantially more severe than ordinary conditions encountered so the results give a clear indication of the effectiveness and amount of the novel corrosion inhibitors required in the particular oil tested to obtain a rating of B++ or better.

*Table II*

| Inhibitor | As Prepared in Example | Dynamic Test Results [1] | |
|---|---|---|---|
| | | Gasoline [2] | Diesel Fuel [3] |
| Mono-oleate mono-sulfonate salt of fatty amido diamine | I | 3.5 | 2.3 |
| Mono-oleate mono-sulfonate salt of fatty diamine | II | 5.8 | 4.5 |

[1] Pounds of inhibitor needed per 1000 barrels of hydrocarbon to obtain a B++ rating or better in the modified ASTM-D665 test. (Dry soap basis.)
[2] API gravity of 62.6; Reid vapor pressure 9.0; boiling range of 96 to 405° F.; ASTM gum 2.7.
[3] See Table I.

The reaction products of Examples I and II were added to diesel fuel and evaluated in accordance with the following static test procedure. A flat strip of mild carbon steel (1/8" x 1/2" x 5 7/8") is cleaned with naphtha or other solvent to remove grease and oil and then polished with emery cloth until no rust or pits remain. During and after these polishing operations the strip should be handled with a clean lintless cloth or a piece of facial tissue. After the strip has been thus prepared it should be carefully wiped free of emery dust. The specimen together with 100 ml. of the sample to be tested are placed in a corked 4-ounce oil sample bottle which is allowed to lay on its side at room temperature for 1 hour. The liquid should cover the test specimen during this contact period. Then add 10 ml. of distilled water, cork tightly, and shake vigorously for 2 minutes to insure water wetting over the entire strip surface. The specimen should be tightly wedged between the cork and the bottom of the bottle to minimize breakage. The bottle is then restored to an upright position and allowed to stand at room temperature. The specimen is examined for rust daily after each day the bottle is shaken to replace water droplets on the specimen in the hydrocarbon phase that may have been disturbed during inspection. When 25 percent of the specimen exposed in the aqueous phase becomes rusted the test has failed. The tests are run in quadruplicate and the average failure time is reported.

As shown below in Table III, the inhibitor compound of Example I gave excellent corrosion protection as indicated by the passing of 642 hours before 25 percent of test coupon had rusted. The significance of the static test shows the usefulness of the inhibitor in systems where the hydrocarbon stock does not flow past the metal surface to replenish the corrosion inhibitor, e.g. as in a storage tank. The diesel fuel employed had an API gravity of 38.6, a boiling range of 370 to 640° F. and an SUS viscosity of 35.6 at 100° F.

*Table III*

| Inhibitor | As Prepared in Example | Static Test Results | |
|---|---|---|---|
| | | Inhibitor Conc.[1] | Hours [2] |
| None | | | 1.5 |
| Mono-oleate mono-sulfonate salt of fatty amido diamine | I | 9 | 642 |
| Mono-oleate mono-sulfonate salt of fatty diamine | II | 9 | 162 |

[1] Pounds per thousand barrels (dry soap basis).
[2] Hours before 25 percent of the area of coupon exposed to the aqueous phase has rusted.

As previously indicated, the corrosion inhibitors of this invention can be prepared by using more than the stoichiometric amount of the reactants and the excess can be included with the principal corrosion inhibitor. The following Example III illustrates the preparation of a corrosion inhibitor when using an excess of fatty amido diamine mono-oleate. Example IV is substantially the same preparation with the exception that a fatty diamine mono-oleate is employed rather than the fatty amido diamine mono-oleate.

EXAMPLE III

Twenty-five parts by weight of the mono-oleate salt of the fatty amido diamine mono-oleate mono-sulfonate by weight of oil-soluble sulfonic acid (as a 10 percent concentration in its mineral base oil, 300 SUS at 100° F., acid number 16.4) were reacted at a temperature of 100 to 120° F. A clear homogeneous solution resulted which was a 32.5 percent concentration of the mono-sulfonate fatty amido diamine salt of the oleic acid together with the excess fatty amido diamine mono-oleate.

EXAMPLE IV

A mono-sulfonate fatty diamine salt of oleic acid was prepared in the above manner by reacting 25 parts by weight of the mono-oleate salt of the fatty diamine described in Example II with 75 parts by weight of mahogany sulfonic acids (10 percent concentration in its base petroleum oil, 300 SUS at 100° F., acid number 16.4). The reaction was carried out at a temperature of 100 to 120° F. and a homogeneous solution resulted which was a 32.5 percent concentration of the mono-sulfonate fatty diamine salt of oleic acid together with excess fatty diamine mono-oleate.

The data of Table IV below illustrate the effectiveness of the fatty amide diamine mono-oleate mono-sulfonate inhibitors containing excess fatty amido diamine mono-oleate as a humidity cabinet corrosion inhibitor as compared to a fatty diamine mono-oleate mono-sulfonate which contains excess fatty diamine mono-oleate. In Examples III and IV, the reactants used to prepare the inhibitors shown in Table IV are in ratios of one mole of fatty diamine mono-oleate or fatty amido diamine mono-oleate to 0.55 mole of sulfonic acid. The base oil employed was a diesel fuel which had an API gravity of 38.6, a boiling point of 370 to 640° F. and a SUS viscosity of 35.6 at 100° F.

*Table IV*

MIL-L-21260 HUMIDITY CABINET TEST RESULTS

| Corrosion Inhibitor | Preparation | Concentration, Weight Percent, Dry Soap Basis | Average Number of Days Before Rusting |
|---|---|---|---|
| Fatty amido diamine mono-oleate mono-sulfonate. | Ex. III | .295 | 4 |
| Do | Ex. III | .65 | 14 |
| Do | Ex. III | .97 | 21+ |
| Mono-oleate fatty diamine mono-sulfonate. | Ex. IV | .295 | 1.5 |
| Do | Ex. IV | .65 | 4 |
| Do | Ex. IV | .97 | 13 |

We claim:
1. A liquid petroleum oil to which a corrosion inhibiting property has been imparted when used under high humidity conditions by the incorporation of a small but effective amount of a chemical compound selected from the formulae:

(I)

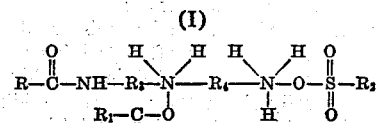

and (II)

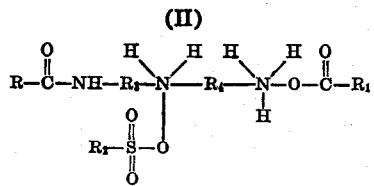

in which R and R₁ represent monovalent hydrocarbon radicals containing from about 6 to 22 carbon atoms, $R_2$ is the aromatic hydrocarbon radical of an aromatic sulfonic acid and $R_3$ and $R_4$ are divalent aliphatic hydrocarbon radicals containing from about 2 to 8 carbon atoms.

2. The composition of claim 1 in which R is a straight chain unsaturated hydrocarbon radical of about 16 to 18 carbon atoms, $R_1$ is the unsaturated hydrocarbon radical of oleic acid, $R_2$ is the aromatic hydrocarbon radical of petroleum mahogany sulfonic acid and $R_3$ and $R_4$ are trimethylene radicals.

3. A light petroleum distillate to which a corrosion inhibiting property has been imparted when used under high humidity conditions by the incorporation of a small but effective amount of from about .001 to 5 percent by weight of a chemical compound selected from the formulae:

(I)

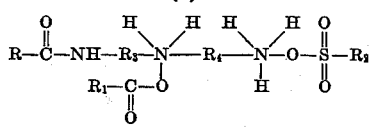

and (II)

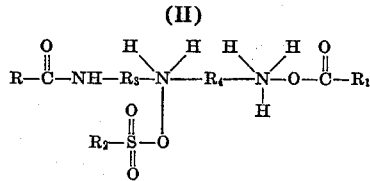

in which R and R₁ represent monovalent hydrocarbon radicals containing from about 6 to 22 carbon atoms, $R_2$ is the aromatic hydrocarbon radical of an aromatic sulfonic acid and $R_3$ and $R_4$ are divalent aliphatic hydrocarbon radicals containing from about 2 to 8 carbon atoms.

4. A diesel fuel to which a corrosion inhibiting property has been imparted when used under high humidity conditions by the incorporation of a small but effective amount of from about .75 to 3 percent by weight of a chemical compound selected from the formulae:

(I)

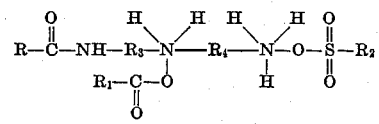

and (II)

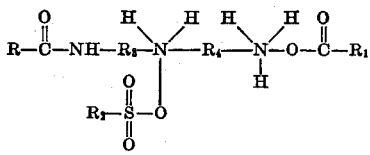

in which R and R₁ represent monovalent hydrocarbon radicals containing from about 6 to 22 carbon atoms, $R_2$ is the aromatic hydrocarbon radical of an aromatic sulfonic acid and $R_3$ and $R_4$ are divalent aliphatic hydrocarbon radicals containing from about 2 to 8 carbon atoms.

5. A gasoline to which a corrosion inhibiting property has been imparted when used under high humidity conditions by the incorporation of a small but effective amount of from about .5 to 2 percent by weight of a chemical compound selected from the formulae:

(I)

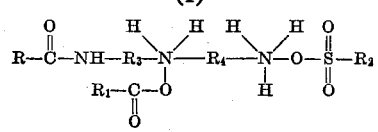

and (II)

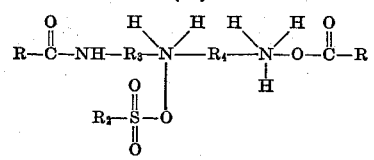

in which R and R₁ represent monovalent hydrocarbon radicals containing from about 6 to 22 carbon atoms, $R_2$ is the aromatic hydrocarbon radical of an aromatic sulfonic acid and $R_3$ and $R_4$ are divalent aliphatic hydrocarbon radicals containing from about 2 to 8 carbon atoms.

References Cited in the file of this patent

UNITED STATES PATENTS

| | | |
|---|---|---|
| 2,329,251 | Chenicek | Sept. 14, 1943 |
| 2,543,852 | Jaccard | Mar. 6, 1951 |
| 2,583,772 | Gunderson | Jan. 29, 1952 |
| 2,596,925 | Gunderson | May 13, 1952 |
| 2,598,213 | Blair et al. | May 27, 1952 |
| 2,805,135 | Bell et al. | Sept. 3, 1957 |
| 2,839,372 | Lindstrom et al. | June 17, 1958 |
| 2,854,324 | Shen et al. | Sept. 30, 1958 |
| 2,862,883 | Hughes et al. | Dec. 2, 1958 |

UNITED STATES PATENT OFFICE
CERTIFICATE OF CORRECTION

Patent No. 2,992,081                              July 11, 1961

David B. Sheldahl et al.

It is hereby certified that error appears in the above numbered patent requiring correction and that the said Letters Patent should read as corrected below.

Column 8, line 14, for "mono-oleate mono-sulfonate" read -- of Example I and 75 parts --; line 35, for "amide" read -- amido --; column 10, lines 34 to 39, for the "R" on the extreme right-hand end of the structural formula (II) read -- $R_1$ --.

Signed and sealed this 9th day of January 1962.

(SEAL)
  Attest:

ERNEST W. SWIDER                                    DAVID L. LADD
Attesting Officer                                         Commissioner of Patents